United States Patent
Dea et al.

(10) Patent No.: US 8,274,386 B1
(45) Date of Patent: Sep. 25, 2012

(54) HUMAN PRESENCE ELECTRIC FIELD SENSOR

(75) Inventors: Jack Y. Dea, San Diego, CA (US); Daniel Tam, San Diego, CA (US)

(73) Assignee: The United States of America as Represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 13/180,934

(22) Filed: Jul. 12, 2011

Related U.S. Application Data

(63) Continuation-in-part of application No. 12/408,768, filed on Mar. 23, 2009, now Pat. No. 8,188,862.

(51) Int. Cl.
*G08B 13/26* (2006.01)

(52) U.S. Cl. .............. 340/561; 340/568.2; 340/573.1

(58) Field of Classification Search .......... 340/561, 340/552, 555, 567, 565, 562, 568.1, 568.2, 340/573.1, 572.4
See application file for complete search history.

(56) References Cited

U.S. PATENT DOCUMENTS

| | | | |
|---|---|---|---|
| 4,609,866 A | 9/1986 | Loftness | |
| 5,512,834 A | 4/1996 | McEwan | |
| 5,796,827 A * | 8/1998 | Coppersmith et al. | 713/182 |
| 6,166,682 A * | 12/2000 | Kosugi et al. | 342/192 |
| 6,970,086 B2 | 11/2005 | Nelson | |
| 7,636,048 B2 | 12/2009 | Krasula et al. | |
| 7,759,931 B2 | 7/2010 | Tsukada et al. | |
| 2003/0034444 A1 | 2/2003 | Chadwick et al. | |
| 2004/0228494 A1* | 11/2004 | Smith | 381/67 |
| 2004/0232776 A1* | 11/2004 | Ozaki et al. | 307/149 |
| 2006/0261818 A1* | 11/2006 | Zank et al. | 324/457 |
| 2007/0205937 A1 | 9/2007 | Thompson et al. | |
| 2009/0228069 A1* | 9/2009 | Dai et al. | 607/54 |

* cited by examiner

*Primary Examiner* — Daniel Previl
(74) *Attorney, Agent, or Firm* — Arthur K. Samora; Kyle Eppele

(57) ABSTRACT

Methods and systems for detection of an electric field generated by the human/animal body can include providing a passive antenna system for detecting changes in the ambient electric field due to interaction of the ambient with the charges generated by the human/animal body, and a high impedance sensor that is fixed to the encapsulated wire antenna. The result is a passive human/animal detection system without any moving parts. The antenna can be an encapsulated wire, and the wire length can be chosen according the desired application. For systems that are intended to detect the presence of a human being or animal, the encapsulated wire can have a length of one hundred feet or more, and a grid of wires can be used for detection within an Area of Interest (AOI).

7 Claims, 5 Drawing Sheets

HUMAN PRESENCE ELECTRIC FIELD SENSOR

This application is a continuation-in-part of U.S. application Ser. No. 12/408,768, filed Mar. 23, 2009 now U.S. Pat. No. 8,188,862 (NC 099292), and entitled "Remote Detection of Covertly Carried Metal Objects". The '768 application is hereby incorporated by reference herein in its entirety.

FEDERALLY-SPONSORED RESEARCH AND DEVELOPMENT

This invention (Navy Case No. 100818) is assigned to the United States Government and is available for licensing for commercial purposes. Licensing and technical inquiries may be directed to the Office of Research and Technical Applications, Space and Naval Warfare Systems Center, Pacific, Code 72120, San Diego, Calif. 92152; voice (619) 553-5118; e-mail ssc pac t2@navy.mil.

FIELD OF THE INVENTION

The present invention applies generally to human presence detection systems. More specifically, some embodiments of the invention pertain to systems and methods for the passive detection of humans using the electrical field generated by the human body.

BACKGROUND OF THE INVENTION

Given the political climates of various locations around the world, soldiers, marines, law enforcement and other personnel from various security agencies are constantly faced with situations where they are confronted with suspect individuals. In certain situations, it may be desirable to set a perimeter around a location for security personnel to identify if a human is within a certain distance of a defined area. Unfortunately, in order to determine whether such suspect individuals are present using conventional search techniques, it has been necessary to use personnel to stand watch. Such personnel may come into close proximity of terrorists and criminals, which can be extremely undesirable and pose a great risk to these personnel.

New technology related to covert detection of humans from a distance is desirable. But the technology itself should be covert, so that the humans being detected do not know that they are being detected. To do this, it may be desirable to use a detection that is completely passive, i.e., that does not emit any electromagnetic energy and look for scattered return energy or pulses, or any other signal such as laser, infrared or the like. Also, the new technology should not have any moving parts, so that the person being detected does not know that he/she is under surveillance.

In view of the above, one object of the present invention is to provide systems and methods for remote detection of human-generated electric fields that are able to detect the presence of human beings at a distance. Another object of the present invention is to provide systems and methods for remote detection of human-generated electric fields that minimize false alarm rates by using detection frequencies that are unique to humans versus other living creatures and by employing a time domain approach to process those frequencies. Still another object of the present invention is to provide systems and methods for remote detection of human-generated electric fields that use the unique electric field of the human body to detect a human subject in a noise-laden area with many other moving objects other than humans. Another object of the present invention is to provide systems and methods for remote detection of human-generated electric fields that do not have moving parts. Yet another object of the present invention is to provide systems and methods for remote detection of human-generated electric fields that can passively detect low-frequency alternating current (AC) fields that correspond to bodily functions. These and other advantages of the invention, as well as additional inventive features, will be apparent from the description of the invention provided herein.

SUMMARY OF THE INVENTION

Methods and systems for detection of an electric field generated by the human/animal body according to several embodiments can include providing a passive antenna for detecting changes in the ambient electric field due to interaction of the human/animal electric field with the antenna. The antenna can be an encapsulated wire, and the length of the wire can be chosen according the application desired by the user.

The methods and systems for detection of an electric field generated by the human/animal body according to several embodiments can further include a high impedance sensor that is fixed to the encapsulated wire antenna. This establishes a system for detecting the presence of a human-generated electric within an area of interest (AOI) without requiring any moving parts. To do this, the sensors can have ultrahigh impedance that roughly matches the ambient impedance of the AOI, or that is greater than $10^{12}$ Ohms. Examples of such high impedance sensors are LMC6081 and LMC6041 CMOS operational amplifiers (opamps).

For systems that are intended to detect the electric field due to the presence of a human/animal being at a long distance from the sensor, the encapsulated wire can have a length of one hundred feet or more, and a grid of wires could be used for detection within an Area of Interest (AOI). For some applications where it is desired to monitor a small area or when it is not feasible to lay long wires, then the short antenna embodiment is preferred. Either embodiment allows for the bodily functions of respiration and heartbeat to be monitored.

BRIEF DESCRIPTION OF THE DRAWINGS

The novel features of the present invention will be best understood from the accompanying drawings, taken in conjunction with the accompanying description, in which similarly-referenced characters refer to similarly referenced parts, and in which.

DETAILED DESCRIPTION OF THE EMBODIMENTS

The disclosed methods and systems below may be described generally, as well as in terms of specific examples and/or specific embodiments. For instances where references are made to detailed examples and/or embodiments, it should be appreciated that any of the underlying principles described are not to be limited to a single embodiment, but may be expanded for use with any of the other methods and systems described herein as will be understood by one of ordinary skill in the art unless otherwise stated specifically.

Figure 1:
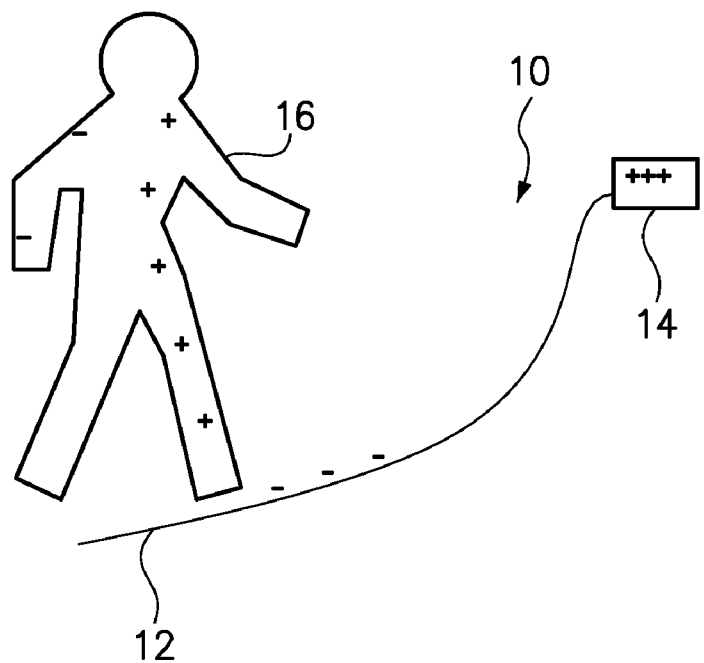
FIG. 1 is an exemplary detection system according to several embodiments of the present invention.

Referring initially to FIG. 1, a human/animal presence detection system in accordance with several embodiments of the present invention is shown, and is generally designated by reference character 10. As shown, the system 10 can include an encapsulated wire antenna 12 that can be connected to a sensor 14. As shown, the system can sense small changes in the ambient electrical field in the near direct current (DC) range, which are due to the interaction of the electrical field from a human 16 (or an animal in several embodiments) with the antenna.

In prior art methods, the ambient electric field is detected by chopping of the field by a rotating metal vane and the chopped field detected by a FET amplifier. The electro-mechanical requirements and the requirement to shield the electro-mechanical noise presented large economic costs in construction. In addition the weight and size of an electric field mill precludes its use as a small portable sensor. The advantage of the electric field mill is that it operates to direct current (DC). However, for human presence detection it is not necessary to operate at DC. It is only necessary to operate at close to DC, i.e., 0.01-2 Hz. The present invention according to several embodiments can obviate the weight and size disadvantages, as it can be a man-portable passive system without moving parts. It can also detect humans and animals motion and bodily functions from behind walls. The main criteria are that the wall is not a grounded conductor. Most walls will function in this manner because they are not grounded conductors.

Figure 2:
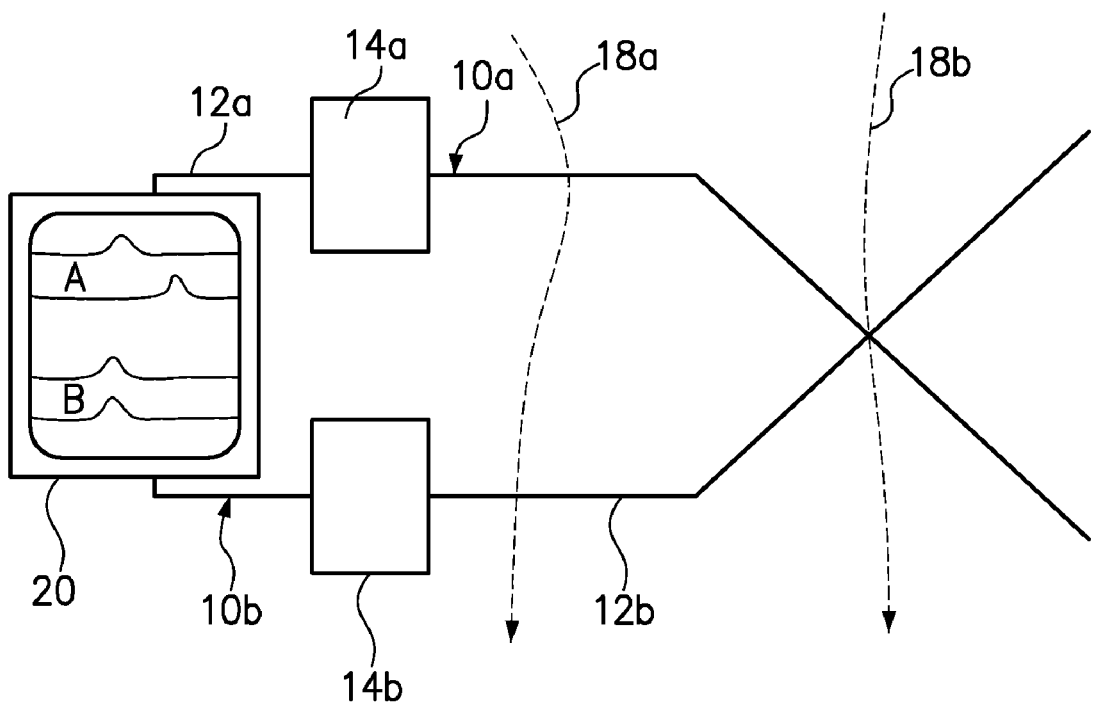
FIG. 2 is a drawing of a plurality of at least two of the detection systems of FIG. 1, which illustrates how a simple detection grid can be established using the systems according to several embodiments.

Referring now to FIG. 2, human/animal presence detection "grid", which can include two systems 10a, 10b can be shown. In FIG. 2, when human 16 follows path 18a, the display 20 can show two signal blips that are not time coincident. However, with the human/animal follows path 18b, the human/animal is equidistant from wire 12a and 12b, and can be detected by wires 12a, 12b at the same time. The resulting signal blips will be substantially time coincident, as indicated by display 20 in FIG. 2. Thus, at least two systems can be arranged to determine not only the presence of a human/animal 16, but also the path taken by the human/animal through an Area of Interest (AOI). A signal analyzer, or processor can be incorporated within system 10 to process the signals received by sensors 14a, 14b to cause a time domain readout on the display 20. In cases where a frequency readout is desired, a Fast Fourier Transform (FFT) of the signal can be generated to obtain a frequency readout at display 20.

Figure 3:
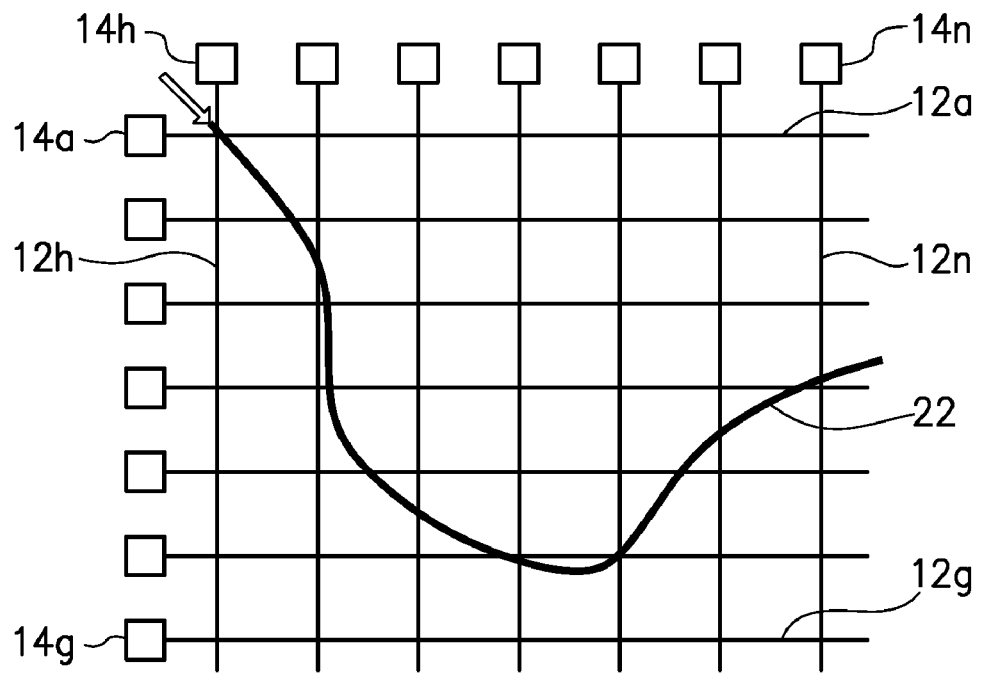
FIG. 3 is the same drawing as FIG. 2, but with a more complex grid that illustrates how the systems and methods according to several embodiments can determine the path of travel of a detected subject within an Area of Interest (AOI)

FIG. 3 illustrates a more complex grid of systems 10. As shown in FIG. 3, fourteen encapsulated wires 12a-12n are arranged in a 7×7 grid. The wires 12 are each connected to a respective sensor 14a-14n. With this configuration, a path 22 that was taken by a human/animal 16 through an AOI can be constructed by noting when 14a-14n detect human 16, and converting those instances of detection into path 22 using an algorithm. When there is a plurality of potential humans/animals crossing the AOI, then a complex algorithm may be required. The algorithm can be accomplished by processor (not shown) using computer readable instructions that can be input into non-transitory medium, and the algorithm can be quite sophisticated, depending on the size of the AOI and the desired tracking capacity of the system 10. However, for simple surveillance purposes where one or two intruders are involved, a simple algorithm will suffice for detection vice tracking purposes.

Figure 4:
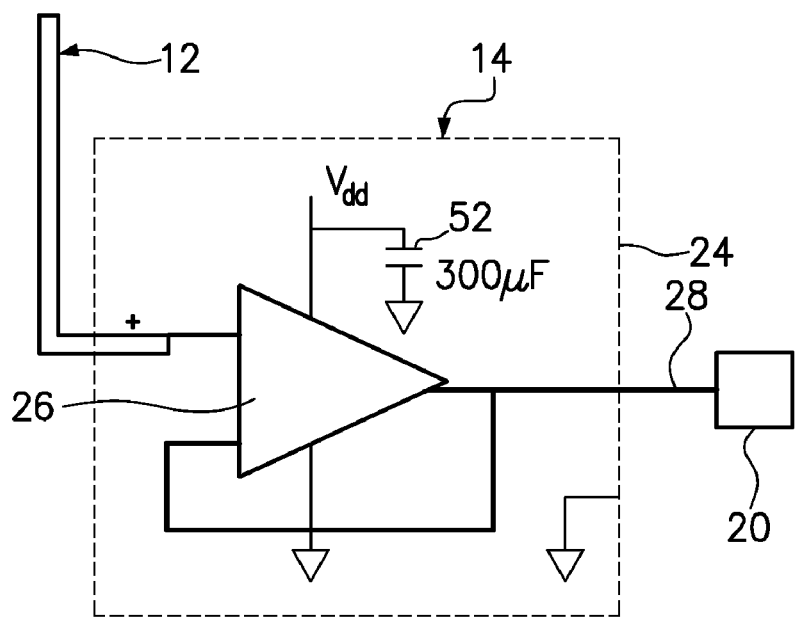
FIG. 4 is drawing of the high impedance sensor for the system of FIG. 1, which shows the sensor in greater detail.
Figure 8:
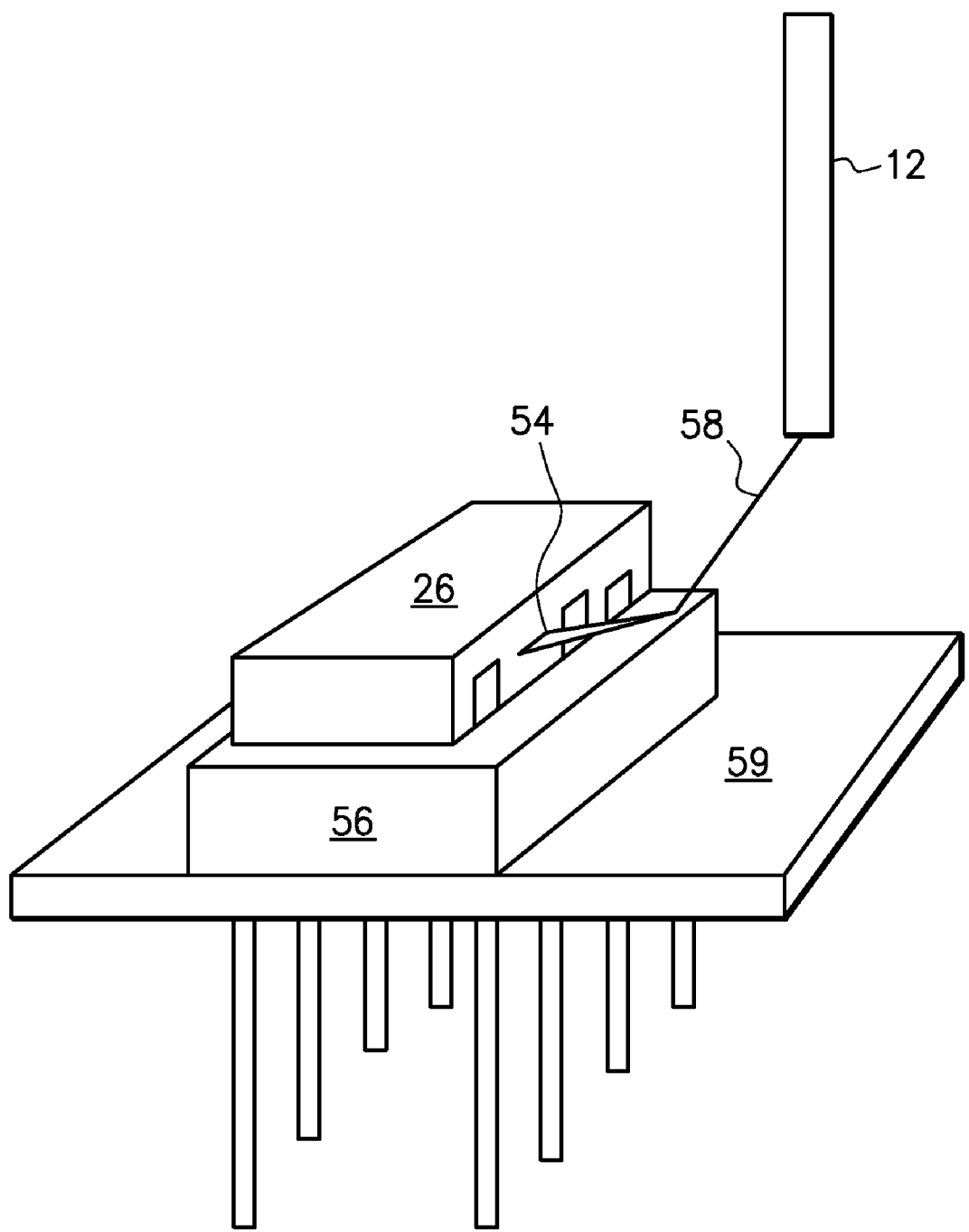

Referring now to FIGS. 4 and 8, the sensor 14 can be shown in greater detail. As shown, the detector can include a metal casing 24. Encapsulated wire 12 extends through casing 24, and can be connected to a high impedance CMOS operational amplifier (opamp) 26. Examples of exemplary CMOS opamps can include the LMC6081 and LMC6041 opamps. Other opamps could be used, provided the impedance is sufficiently high (greater than $10^{12}$ Ohms) to allow for detection of charge flowing from encapsulated wire 12 to opamp 26 (this charge is due to separation of charge in the human/animal body and detection of that charge separation at wire 12). In FIG. 4, a 300 μF capacitor 52 is connected at power supply to prevent uneven powering of the opamp 26. An output depicted by line 28 extends from opamp 26, through casing 24 and connects to display 20.

FIG. 8 illustrates the manner in which opamp 26 can be attached to antenna 12. As shown, one of the input pins 54 from opamp 26 can be bent so that is not inserted into dip socket 56 when opamp 26 is attached to circuit board 59. Instead, one of the input pins 54 extends outwardly from opamp 26. The wire 58 from antenna can be directly fastened to the extending input pin 54. With this configuration, the air inside the casing (see FIG. 4) functions as as the impedance instead of the circuit board/dip socket combination. The circuit board has good impedance (~$10^{12}$ Ohms), but air has higher impedance (~$10^{14}$ Ohms), which results in more effective operation of the system according to several embodiments.

In several embodiments, the MOSFET transistor can be used within the high impedance sensor instead of opamp 26. The gate of a MOSFET transistor can be used as the high impedance sensor to measure the electric field of the charge from a human body, as described above. But MOSFET transistors can be cumbersome at times, in that they require a manual bias that needs periodic recharging.

With the addition of an encapsulated electrostatic near-field antenna, this system 10 has been shown to be able to measure low frequency signals down to 0.01 Hz, almost at the DC level. Human/animal vital signs at least 18 feet from the antenna can be readily be monitored. When the person/animal is present, the breathing and heat beat signals of the person/animal can be captured by the signal analyzer 20 that is attached to the sensor 14 and extracted easily from the electric field voltage time domain data in frequency domain using FFT techniques. The old method of using an electric field mill is too clumsy, expensive and even dangerous because of the fast rotating vanes.

Figure 5:
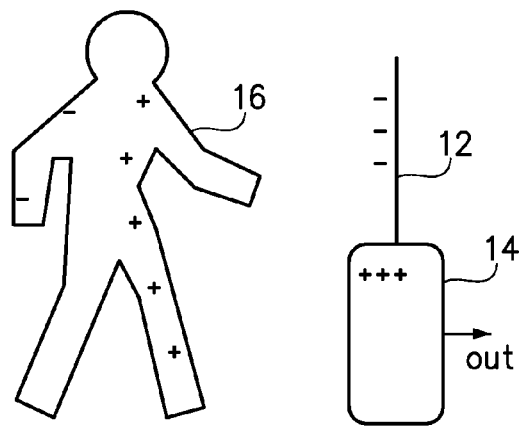
FIG. 5 is a drawing of an alternative embodiment of the detection system of FIG. 1.

As described above, the system 10 can include an ultra high impedance operational amplifier whose input is connected to an encapsulate antenna. Operation in the long wire mode is shown in FIGS. 1-3 and described above. Referring now to FIG. 5, operation in the short antenna mode can be shown. As shown in FIG. 5, the encapsulated wire 12 can be trimmed to a length of less than one foot. With this configuration, and when sensor 14 is within ten feet of human 16, the encapsulated electrostatic near-field wire antenna can pick up frequency response peaks that correspond to the human heartbeat and respiration. The long wire embodiment can also pick up the same frequency response peaks, but at a different distance range.

Figure 6:
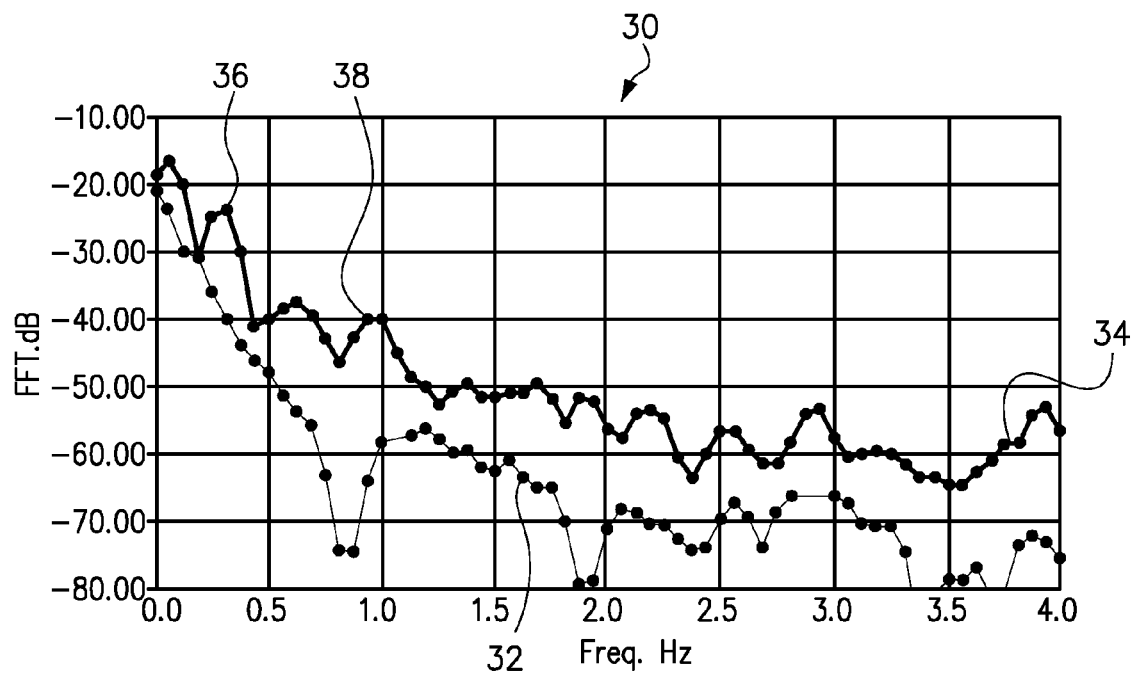
FIG. 6 is a graph that depicts a variety of response signal information for a human subject that has been generated using the alternative embodiments of the systems of the present invention shown in FIG. 5.

Referring now to FIG. 6, a graph 30 that illustrates the electric field detected by sensor 14 can be shown. Graph 30 includes a curve 32 that corresponds to the ambient electrical field in the AOI that is detected by sensor 14. When a human enters the AOI, the electric field generated by the human body interacts with the ambient electric field. This interaction results in charge separation that is detected at sensor 14. The charges travel along encapsulated wire 12 and are detected by sensor 14 and displayed by the signal analyzer. The change in electric field due to the interaction is shown as curve 34 in FIG. 6.

Curve 34 in FIG. 6 illustrates the mode of the invention, where the encapsulated wire antenna 12 is used to capture changes in the electric field due to human bodily functions. The encapsulated wire can be adapted to detect direct fields which occur due to charge separation of a nearby human body. A frequency response peak 36 in FIG. 6 is at 0.3 Hz, which corresponds to a respiratory rate of about 20 breaths per minute, can be noted by the output of the signal analyzer at display 20. Frequency response peak 38 in FIG. 6 is at about 1 Hz, and corresponds to a heartbeat of approximately 60 beats per minute. Thus, the system 10 can be configured with a signal analyzer to detect the charged field from humans and the small signatures resulting from the human breathing and heartbeat functions.

Figure 7:
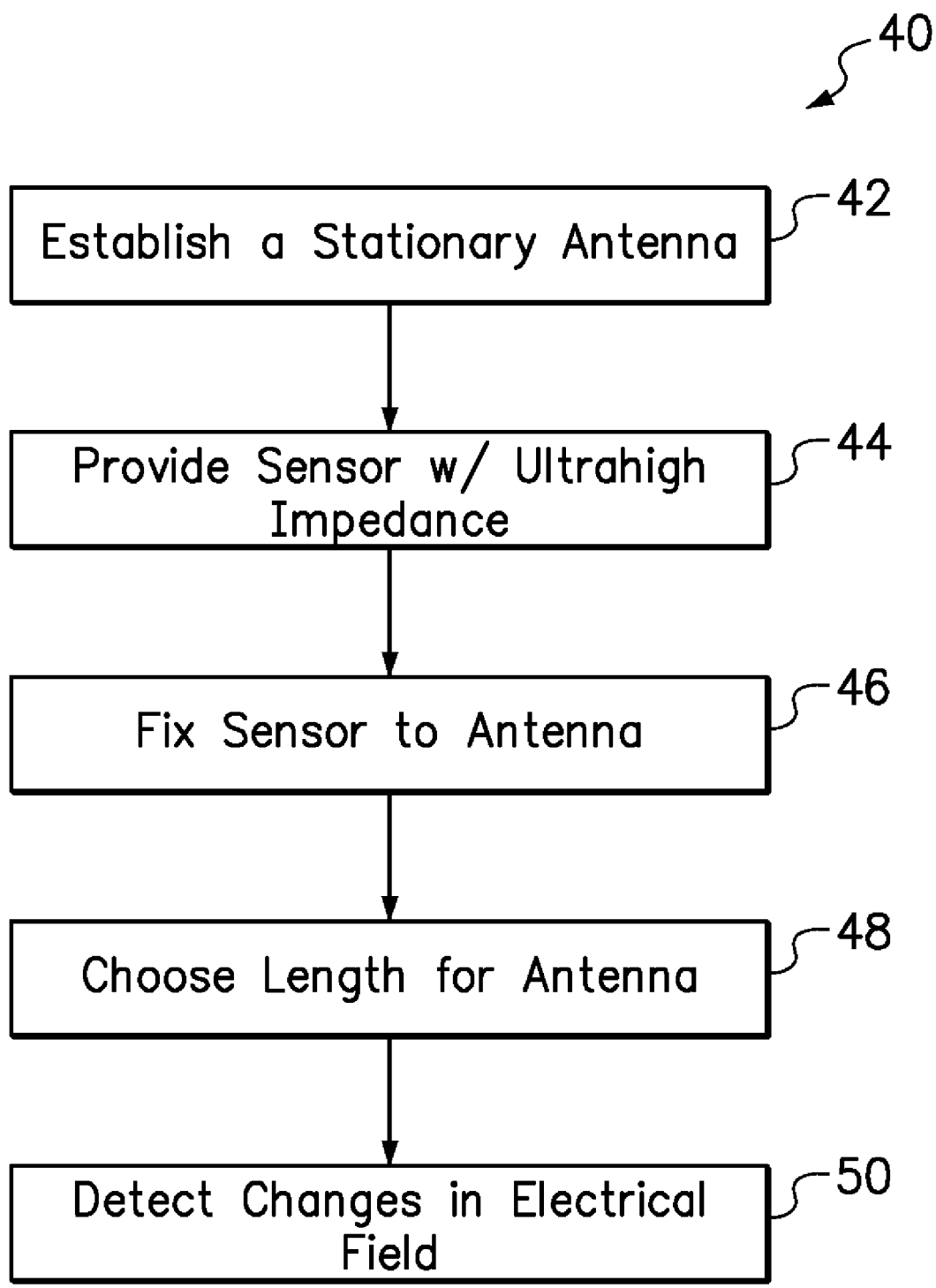
FIG. 7 is a flowchart outlining an exemplary process for practicing the invention shown in FIG. 1, according to several embodiments of the present invention; and, FIG. 8 is a drawing which shows that manner in which the opamp for the sensor of FIG. 6 is attached to the antenna for the system according to several embodiments.

Referring now to FIG. 7, a block diagram 40 that is illustrative of methods that can be performed according to several embodiments of the present invention can be shown. As shown, method 40 can include the initial step 42 of establishing a stationary antenna 12 in the AOI to be monitored. The antenna can be an encapsulated wire having the structure as described above. The methods can further include step 44 of providing a sensor with ultra-high impedance. To accomplish this step, a sensor having an impedance that corresponds to the ambient impedance of the AOI (greater than $10^{12}$ Ohms) can be provided.

The next step for several embodiments of the methods can be to fix the sensor to the stationary antenna, as depicted by box 46 in FIG. 7. Next, step 48 can be to choose the length of the antenna according to the desired application. For applications where it is desired to detect to merely detect living human bodies within a large AOI at a long distance from the sensor, the wire can be 100 feet or more. A single wire can be set up to function as a "tripwire", or a grid of sensors can be arranged to track motion of a human body through an AOI. For applications where a small area is to be monitored or the sensor is desired to be portable, the antenna can be chosen to be one foot or less. Next, the methods can include the step 50 of detecting changes in the electrical field, which are due to the interaction of the ambient electrical field with the electrical field due to the human body due to separation of charge in the human body, as described above.

In various embodiments where the above-described systems and/or methods are implemented by a processing device, or by using a programmable device, such as a computer-based system or programmable logic, it should be appreciated that the above-described systems and methods can be implemented using any of various known or later developed programming languages, such as "C", "C++", "FORTRAN", Pascal", "VHDL" and the like.

Accordingly, various storage media, such as magnetic computer disks, optical disks, electronic memories and other similar non-transitory storage media, can be prepared that can contain information that can direct a processor, which can be a computer, to implement the above-described systems and/or methods. Once an appropriate device has access to the information and programs contained on the storage media, the storage media can provide the information and programs to the device, thus enabling the device to perform the above-described systems and/or methods.

Storage devices can also used to retrieve respiration and heart beat data common to humans, as well as data common to other animals such as dogs and horses. These data are used to "identify" the subject being monitored. For example, a subject with heart beat of 60 beats per minutes is most likely to be human, while a subject whose heart beat is at 100 beats per minutes is most likely a dog. As such, and as described above, the systems and methods according to several embodiments could also be used to detect animals as well as humans, and to monitor animal functions such as respiration and heartbeat, provided representative data for such animals and such functions is available and input into the storage media For example, if a computer disk containing appropriate materials, such as a source file, an object file, an executable file or the like, were provided to a computer, the computer could receive the information, appropriately configure itself and perform the functions of the various systems and methods outlined in the diagrams and flowcharts above to implement the various functions. That is, the computer could receive various portions of information from the disk relating to different elements of the above-described systems and/or methods implement the individual systems and/or methods and coordinate the functions of the individual systems and/or methods related to communications.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

What is claimed is:

1. A passive system for detecting an electric field generated by a human body within an area of interest (AOI), comprising:
   a stationary antenna located within said AOI;
   a high impedance sensor fixed to said stationary antenna; and,
   said sensor having an impedance of at least $10^{12}$ Ohms, said stationary antenna and said high impedance sensor cooperating to detect said electric fields having a frequency of less than 100 Hz.

2. The system of claim 1, wherein said antenna comprises an encapsulated wire.

3. The system of claim 1 further comprising a signal analyzer connected to said sensor.

4. The system of claim 3, wherein said signal analyzer is adapted to display frequency response peaks corresponding to human/animal bodily functions.

5. A passive method for detecting an electric field generated by a human body within an area of interest (AOI), comprising the steps of:
   A) establishing a stationary antenna within said AOI;
   B) connecting a high impedance sensor to said stationary antenna;
   C) detecting changes in the ambient electrical field at frequencies of less than 100 Hz, which are due to charge separation in said human body; and,
   said AOI having an ambient impedance, and said step C) being accomplished with a sensor having an impedance of at least $10^{12}$ Ohms.

6. The method of claim 5 wherein said step A) is accomplished using an encapsulated electrostatic near-field wire for said antenna.

7. The method of claim 5 further comprising the step of:
   D) connecting a signal analyzer to said high impedance sensor to display the electric field results of said step C).

* * * * *